US012134257B2

(12) United States Patent
Kinzelmann et al.

(10) Patent No.: US 12,134,257 B2
(45) Date of Patent: Nov. 5, 2024

(54) METHOD AND DEVICE FOR ADHESIVELY BONDING SUBSTRATES IN FILM FORM AND COMPOSITE BODY OBTAINED THEREBY

(71) Applicant: Henkel AG & Co. KGaA, Duesseldorf (DE)

(72) Inventors: Hans-Georg Kinzelmann, Pulheim (DE); Michael Gierlings, Kaarst (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/368,379

(22) Filed: Jul. 6, 2021

(65) Prior Publication Data
US 2022/0063258 A1    Mar. 3, 2022

Related U.S. Application Data

(63) Continuation of application No. PCT/EP2019/086391, filed on Dec. 19, 2019.

(30) Foreign Application Priority Data

Jan. 11, 2019   (EP) .................................... 19151375

(51) Int. Cl.
*B32B 37/12*   (2006.01)
*B32B 7/12*    (2006.01)
(Continued)

(52) U.S. Cl.
CPC ................ *B32B 37/12* (2013.01); *B32B 7/12* (2013.01); *B32B 15/08* (2013.01); *B32B 27/08* (2013.01);
(Continued)

(58) Field of Classification Search
CPC .......... B32B 37/12; B32B 7/12; B32B 15/08; B32B 27/08; B32B 37/0053; B32B 37/04;
(Continued)

(56) References Cited

U.S. PATENT DOCUMENTS

| 4,069,081 A | 1/1978 | Drower et al. |
| 5,582,669 A | 12/1996 | Gove et al. |

(Continued)

FOREIGN PATENT DOCUMENTS

| CN | 100999870 A | 7/2007 |
| CN | 108290379 A | 7/2018 |

(Continued)

OTHER PUBLICATIONS

DE102010040059A1 Machine Translation of Description (Year: 2022).*

(Continued)

*Primary Examiner* — Cynthia L Schaller
(74) *Attorney, Agent, or Firm* — Sun Hee Lehmann

(57) ABSTRACT

The present invention relates to a method for adhesively bonding substrates in film form, wherein one of the substrates has a thermoplastic surface which is converted into a softened state prior to adhesive bonding, and wherein the surface of this substrate that is opposite to the thermoplastic surface is cooled using a cooling roller. Furthermore, the present invention relates to a device for carrying out the method according to the invention.

15 Claims, 1 Drawing Sheet

(51) Int. Cl.
*B32B 15/08* (2006.01)
*B32B 27/08* (2006.01)
*B32B 37/00* (2006.01)
*B32B 37/04* (2006.01)
*B32B 37/06* (2006.01)
*B32B 37/08* (2006.01)
*B32B 37/20* (2006.01)

(52) U.S. Cl.
CPC .......... *B32B 37/0053* (2013.01); *B32B 37/04* (2013.01); *B32B 37/06* (2013.01); *B32B 37/08* (2013.01); *B32B 37/203* (2013.01); *B32B 2310/0825* (2013.01); *B32B 2398/20* (2013.01)

(58) Field of Classification Search
CPC ....... B32B 37/06; B32B 37/08; B32B 37/203; B32B 2310/0825; B32B 2398/20; B32B 37/20; B32B 37/1292; B32B 41/00; B32B 37/0015; B32B 37/003; B32B 37/0007
See application file for complete search history.

(56) References Cited

U.S. PATENT DOCUMENTS

| | | | |
|---|---|---|---|
| 5,695,579 A * | 12/1997 | Rowland | B32B 37/06 156/308.2 |
| 10,350,855 B2 | 7/2019 | Kinzelmann et al. | |
| 10,934,458 B2 | 3/2021 | Kinzelmann et al. | |
| 11,065,849 B2 | 7/2021 | Ackermann et al. | |
| 11,628,658 B2 | 4/2023 | Gierlings et al. | |
| 2004/0046290 A1 | 3/2004 | Kim et al. | |
| 2011/0041981 A1 | 2/2011 | Persson et al. | |
| 2017/0203543 A1 * | 7/2017 | Kinzelmann | B32B 27/10 |
| 2018/0162113 A1 | 6/2018 | Kono et al. | |
| 2020/0384751 A1 * | 12/2020 | Gierlings | B32B 37/0053 |

FOREIGN PATENT DOCUMENTS

| | | | |
|---|---|---|---|
| DE | 102010040059 A1 * | 3/2012 | |
| EP | 0296505 A1 | 12/1988 | |
| EP | 2880084 B1 | 7/2019 | |
| EP | 3526042 B1 | 5/2020 | |
| JP | S5351274 A | 5/1978 | |
| JP | H07100898 A | 4/1995 | |
| WO | 2016026918 A1 | 2/2016 | |

OTHER PUBLICATIONS

Machine Translation of WO 2016/026918 published Feb. 25, 2016. (Year: 2023).*
International Search Report for International PCT Patent Application No. PCT/EP2019/086391 dated Feb. 24, 2020.
Thermoplastics—an overview, ScienceDirect Topics, https://www.sciencedirect.com/topics/materials-science/thermoplastics, pp. 1-9.

* cited by examiner

METHOD AND DEVICE FOR ADHESIVELY BONDING SUBSTRATES IN FILM FORM AND COMPOSITE BODY OBTAINED THEREBY

The present invention relates to a method for adhesively bonding substrates in film form, one of the substrates having a thermoplastic surface which is converted into a softened state prior to adhesive bonding, and the surface of this substrate opposite the thermoplastic surface being cooled using a cooling roller. The present invention also relates to a device for carrying out the method according to the invention and to a composite body which can be obtained by means of the method according to the invention.

A person skilled in the art is familiar with a wide variety of methods for adhesively bonding substrates in film form, it being possible to use a wide variety of adhesives to connect the substrates. As a rule, the adhesive is applied to a surface of a first substrate and the substrates are then brought into contact with one another under pressure. In this case, there is the problem that, in order to ensure a sufficient connection of the two substrates, and also to even out certain irregularities in the surface of the substrates and to prevent the formation of air bubbles during lamination, the adhesive should wet the surface of the substrate as completely as possible. In this respect, the amounts of adhesive required to prevent delamination of the product are relatively high. The use of the required amounts of adhesive has known disadvantages, such as the excessive use of resources and the costly disposal and processing of the waste produced. In view of the increasing scarcity of resources and increasing pollution of the environment, there is therefore a need for industrial methods that allow responsible and sustainable management of resources and the environment. In view of the disadvantages mentioned, reducing the amount of adhesive used seems to be an obvious solution. A reduction in the amount of adhesive per se has proved impractical in initial tests, since the products showed an increasing tendency to delaminate and the formation of air bubbles during lamination could no longer be eliminated, which, particularly in the case of transparent products, leads to severe impairment of the mechanical and optical properties. In order to obtain optically and mechanically reliable products despite a small amount of adhesive, it was therefore necessary to use substrates with smooth surfaces.

One approach to smoothing the surface of the substrates is to use a thermoplastic substrate, the surface of which can be smoothed by the action of heat before adhesive bonding. However, heating the surface of the substrate in order to smooth it has the disadvantage that the heated substrate is deformed and stretched such that the web guiding of the substrate during lamination is made difficult and the composite body obtained no longer has the desired properties. The prior art suggests various approaches as to how the problem of deformation of the substrate can be addressed.

U.S. Pat. No. 4,069,081 describes a lamination process in which a protective film is applied to a relatively flexible substrate document and in which the product obtained is prevented from curling. For this purpose, a composite film is provided which has a protective film comprising a robust, transparent, and abrasion-resistant resin and an inner layer made of a transparent thermoplastic composite resin, with a certain number of pigments which block radiant heat being added to the composite resin. The layer of composite resin is heated in such a way that the heat falls directly on the composite resin and the composite film is laminated onto the substrate by passing the composite film and the substrate between a first and a second press roller immediately after heating, the adhesive surface of the film being brought into contact with an inner surface of the substrate while the outer surface of the film faces the first press roller and the outer surface of the substrate faces the second press roller.

US 2018/0162113 relates to the manufacture of a laminated film, in which a coating comprising a radiation-curing resin is applied to a first film in a first coating step, a second film is laminated onto the coating in a lamination step, and a cured layer is formed in a curing step during which the coated film is guided between the first and second films. The steps are each carried out in a state in which the first film is being guided around a backup roller. The backup roller can have a temperature control unit for controlling the surface temperature of the roller.

WO 2016/026918 describes a method for adhesively bonding two substrates, in which a first substrate in film form containing at least one thermoplastic is passed, by means of a supporting conveyor belt, through a heating zone in which the substrate is heated such that the surface of the substrate is converted into a softened state, the substrate is joined to a second substrate during and/or immediately after heating, the second substrate being coated with an adhesive with a layer weight of 0.01 to 4 $g/m^2$, and the two substrates are adhesively bonded together under pressure. In order to ensure that only the surface of the substrate to be bonded is converted into a heated state, it is proposed that the surface which is not to be bonded be cooled. However, the described method has the disadvantage that only indirect cooling of the substrate is possible through the use of the conveyor belt, which leads to an increased energy consumption. Furthermore, there is only a limited choice of materials for the conveyor belt, since the conveyor belt itself must not be allowed to heat up in order to prevent the conveyor belt from stretching in the tensile direction.

U.S. Pat. No. 5,582,669 describes a method and a device for applying a protective coating to an image carrier medium. In this case, a heating roller and an actively cooled cooling roller are arranged in such a way that they form a gap through which the protective coating applied to a web and the image carrier medium are passed. The adhesion between the surface of the protective coating and the image is stimulated by a temperature gradient between the layers of the web and the medium, while common problems with lamination, such as curling and rolling of the substrates, are supposed to be avoided.

US 2011/041981 describes a laminating station for laminating a film or a material layer onto a web of paperboard or cardboard, the laminating station comprising a pressure roller and a cooling roller and a gap being formed between the rollers which compresses the material layer or the film and the web made of cardboard, the film or the material layer resting on the cooling roller behind the gap for a predetermined angular interval. A shoe press roller is used as the pressure roller.

The methods described in the prior art have the disadvantage that their implementation is limited in terms of material and execution to the effect that either special resins must be used or complex process setups are necessary to ensure dimensionally stable lamination of flexible substrates, even using small amounts of adhesive. The problem addressed by the present invention is therefore that of providing a method which allows dimensionally stable lamination of flexible substrates using small amounts of adhesive.

It has surprisingly been found that this problem is solved by a method in which a first surface of a substrate is heated, while the side opposite this surface is cooled with the aid of a cooling roller. Therefore, the present invention relates to a method for adhesively bonding substrates, said method comprising a) providing a first substrate in film form having a thermoplastic surface;
b) providing a second substrate on the surface of which an adhesive is applied; and
c) joining the first and second substrates under pressure, the thermoplastic surface of the first substrate being in a softened state during the joining process and the surface of the first substrate opposite the softened surface being cooled by means of a rotating cooling roller.

It has surprisingly been found that cooling the surface opposite the thermoplastic surface by means of a cooling roller can prevent deformation of the substrate without a reduction in the process speed being necessary. The use of a cooling roller also offers the advantage that the surface of the roller with which the surface of the substrate to be cooled is in contact can be cooled directly, thereby avoiding unnecessary energy losses. In contrast, the use of a conveyor belt, as proposed in the prior art, has the disadvantage that the conveyor belt itself can only be cooled indirectly, which makes effective cooling of the substrate surface more difficult.

DETAILED DESCRIPTION

Figure 1:
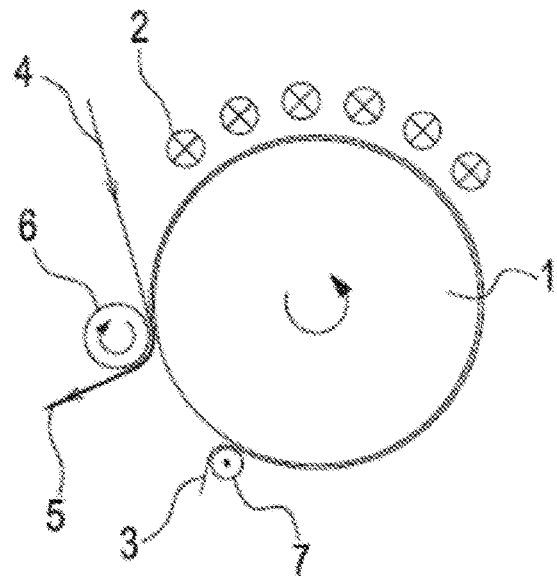
FIG. 1 shows an embodiment in which the cooling roller is designed as part of the means for joining the first and second substrates.

In the context of the present invention, softened state denotes a state in which the thermoplastic surface of the first substrate can be plastically deformed without changing the dimensions of the substrate.

Film form or film within the meaning of the present invention denotes a very thin material produced in webs for adhesive bonding or packaging, preferably made of metal or plastic.

According to the method according to the invention, the surface of the first substrate opposite the heated surface of the first substrate is cooled by means of a rotating cooling roller, the first substrate preferably being guided around the cooling roller. The contact area between the cooling roller and the first substrate can be adapted as required. It has proven to be particularly advantageous if the cooling roller is actively driven, since in this way the risk of the substrate being stretched during the process can be minimized. An embodiment in which the cooling roller is an actively driven cooling roller is therefore preferred. The cooling roller is particularly preferably operated at web speed in order to avoid any deformation of the substrate. In the context of the method according to the invention, there are no special requirements for the coolant used in the cooling roller. In a preferred embodiment, the cooling roller is operated using a liquid coolant, in particular water.

According to the invention, the first substrate and the second substrate are joined under pressure. The substrates can be joined in a conventional manner known to the person skilled in the art, for example using a lamination machine. The lamination machine is preferably integrated into the cooling roller arrangement or formed separately therefrom. The two substrates are preferably joined by exerting a uniform pressure over the entire width of the substrates. In a particularly preferred embodiment, the substrates are joined by the second substrate being joined to the first substrate which rests on the cooling roller. It was surprisingly found that the dimensional stability, in particular of the first substrate, could be increased in this way.

The thermoplastic surface of the first substrate is preferably converted into a softened state by heating, the heating being carried out by means of at least one heating element which is arranged opposite the cooling roller. In a preferred embodiment, the at least one heating element is arranged around the periphery of the cooling roller. In a preferred embodiment, the at least one heating element comprises a series of separate heating elements, preferably IR radiators. The number of individual heating elements is determined by the diameter of the cooling roller and is preferably at least 3, more preferably 3 to 15, particularly preferably 3 to 10, in particular 3 to 5. In a particularly preferred embodiment, the separate heating elements are arranged around the periphery of the cooling roller. In another preferred embodiment, the various heating elements of the at least one heating element are arranged around at least a quarter of the periphery of the cooling roller, particularly preferably around at least half of the periphery. The various heating elements are very particularly preferably arranged around the entire periphery of the cooling roller, it being clear to the person skilled in the art that the arrangement takes place in such a way that there is no impairment of the process sequence and/or other components. It has proven to be particularly advantageous if the at least one heating element is arranged in spatial proximity to the point in the course of the process at which the first substrate and the second substrate are joined, preferably with the aid of a lamination machine. An embodiment in which the at least one heating element is arranged in spatial proximity to the lamination machine is therefore particularly preferred. It has surprisingly been found that, in this way, the substrate surface of the first substrate can be converted into a softened state in such a way that a reliable bond is achieved between the first substrate and the second substrate. A number of measures for heating the thermoplastic surface of a substrate, for example by means of hot air or electromagnetic radiation, are known to a person skilled in the art. It has proven to be particularly advantageous to carry out the heating by means of IR radiation, since in this way a surprisingly homogeneous heating of the surface can be achieved. An embodiment of the method according to the invention in which the thermoplastic surface of the first substrate is converted into a softened state by heating by means of IR radiation is therefore preferred.

The method according to the invention is distinguished in particular by the fact that, despite only a small amount of adhesive, it provides laminated substrates which are characterized by excellent bond adhesion. An embodiment in which the layer weight of the adhesive on the surface of the second substrate is less than 2 $g/m^2$, preferably less than 1 $g/m^2$, particularly preferably 0.1 to 0.7 $g/m^2$, is therefore preferred.

Furthermore, the method according to the invention is characterized in that, in contrast to the methods described in the prior art, there are no special requirements for the adhesive used. Rather, conventional adhesives, as known to a person skilled in the art, can be used. Therefore, an embodiment in which the adhesive applied to the second substrate is selected from thermoplastic adhesives or crosslinking adhesives in solvent-containing, aqueous or solvent-free form is preferred, it being possible to use both 1-component systems and 2-component systems. The adhesive is particularly preferably selected from the group consisting of adhesives based on thermoplastic polymers such as polyurethanes, ethylene vinyl acetate, or polyacrylates, solvent-containing adhesives such as acrylate adhesives, 1K or 2K polyurethane adhesives, silane-crosslinking adhesives, reactive hot melt adhesives such as 1K polyurethane adhesives, epoxy amine adhesives, and radiation-curing adhesives. Adhesives based on polyurethanes, ethylene vinyl acetate or polyacrylates are particularly preferably used. Polyurethane adhesives in particular are used in the context of the present method.

The method according to the invention is particularly suitable for laminating substrates in film form. Although substrates not in film form such as wood-based materials or sheet metal can be used as the second substrate, the second substrate is preferably also a substrate in film form which is preferably selected from the group consisting of thermosetting or thermoplastic plastics, organic polymers, and metals and metal alloys. For example, the second substrate can be a substrate in film form based on aluminum or an aluminum alloy or a plastics film. In a preferred embodiment, the second substrate is selected from the group consisting of polyethylene or polypropylene-coated aluminum, biaxially stretched polyamide, biaxially stretched polyethylene terephthalate, oriented polypropylene, and oriented polyethylene.

The first substrate is distinguished in particular by its thermoplastic surface. In a preferred embodiment, the first substrate is a substrate consisting of or comprising polyolefins, polyvinyl chlorides, ethylene copolymers, polyesters, polyethers, and/or polyamides. Polyethylene, polypropylene, polyvinyl chlorides, or ethylene copolymers are particularly preferably used, in particular polyethylene and polypropylene.

Multilayer substrates can also be used as the first and/or second substrate in the method according to the invention, as long as the first substrate has a thermoplastic surface and the second substrate has a surface to which an adhesive can be applied. Multilayer films with a core layer of an oxygen barrier material, for example, can be used as multilayer substrates, it being possible to use conventional oxygen barrier materials such as vinylidene chloride copolymers with different comonomers such as vinyl chloride (VC-VDC copolymer) or methyl acrylate (MA-VDC copolymer), polyamides, and ethylene vinyl alcohol copolymer (EVOH). In a particularly preferred embodiment, coextruded, oriented polypropylenes and/or coextruded ethylene vinyl alcohol films are used.

The substrates used are each preferably substrates in film form. An embodiment in which the first and/or the second substrate have a thickness of 2 to 100 µm, preferably 4 to 80 µm, is therefore preferred.

In the context of the present invention, it was surprisingly found that deformation of the first substrate, in particular in the advancement direction, can be prevented by cooling the surface opposite the heated surface. It was possible to achieve improved dimensional stability of the first substrate in particular when the substrate was passed over a cooling roller and the temperature difference between the surface of the roller and the surroundings was at least 10° K, preferably at least 15° K. Therefore, an embodiment of the method according to the invention in which the temperature difference between the surface of the cooling roller and the surroundings is at least 10° K, preferably at least 15° K, is preferred. The method according to the invention has the further advantage that the advantageous temperature differences can be set through the use of conventional coolants such as water.

The present invention also relates to a device for carrying out the method according to the invention, the device having the following:
- a feed apparatus for a first substrate in film form, the substrate having a thermoplastic surface;
- a feed apparatus for a second substrate, on the surface of which an adhesive is applied;
- a rotatably drivable cooling roller;
- at least one heating element for heating the surface of the first substrate, the at least one heating element being arranged opposite the cooling roller, and
- means for joining the first and second substrates.

In a preferred embodiment, the device has more than one heating element, which heating elements are arranged at least partially around the periphery of the cooling roller. In a preferred embodiment, the at least one heating element comprises a series of separate heating elements, preferably IR radiators. The number of individual heating elements is determined by the diameter of the cooling roller and is preferably at least 3, more preferably 3 to 15, particularly preferably 3 to 10, in particular 3 to 5. In a particularly preferred embodiment, the separate heating elements are arranged around the periphery of the cooling roller. In another preferred embodiment, the various heating elements of the at least one heating element are arranged around at least a quarter of the periphery of the cooling roller, particularly preferably around at least half of the periphery. The various heating elements are very particularly preferably arranged around the entire periphery of the cooling roller, it being clear to the person skilled in the art that the arrangement takes place in such a way that there is no impairment of the process sequence and/or other components. It has proven to be particularly advantageous if the at least one heating element is arranged in spatial proximity to the point in the course of the process at which the first substrate and the second substrate are joined, preferably with the aid of a lamination machine. An embodiment in which the at least one heating element is arranged in spatial proximity to the lamination machine is therefore particularly preferred. In this way, homogeneous heating of the surface of the first substrate can be ensured while the method is being carried out, without the web speed of the substrate having to be slowed down or adjusted in any other way. The at least one heating element is particularly preferably an IR heating element.

The temperature which is required to convert the thermoplastic surface of the first substrate into a softened state can vary depending on the substrate used. Therefore, an embodiment of the device according to the invention in which the distance between the at least one heating element and the thermoplastic surface of the first substrate is variable is preferred. The at least one heating element of the device according to the invention is preferably arranged in such a way that the distance between the heating element and the cooling roller can be reduced or increased. For embodiments in which more than one heating element is used, the distance between the individual heating element and the cooling roller can preferably be controlled individually.

In the context of the present invention, it has proven to be particularly advantageous if the first substrate is guided over only one cooling roller, it being possible to adapt the size and diameter of the roller to the respective requirements, since in this way the cooling roller also acts as a backup roller for the substrate. Nonetheless, alternative embodiments in which the device according to the invention has more than one cooling roller, i.e. in which the first substrate is guided around more than one cooling roller, are also preferred.

Conventional means such as rollers and conveyor belts, in particular rollers, are preferably used as feed apparatuses in the device according to the invention.

The device according to the invention is intended in particular for the lamination of substrates in film form. An embodiment in which the cooling roller is part of the means for joining the first and second substrates, and in which the means also has one or more rollers for pressing the second substrate against the first substrate which rests on the cooling roller, is therefore preferred. In this way, the additional supporting effect of the cooling roller can be used when the substrates are joined and good smoothing of the surface of the first substrate can be achieved while maintaining the shape. In a particularly preferred embodiment, the heating elements and the rollers for pressing the second substrate are each arranged over half the circumference of the cooling roller.

In an alternatively preferred embodiment, it has proven to be advantageous if the means for joining the first and second substrates is designed independently of the cooling roller. In this way, it is possible to operate the cooling roller independently of the web speed of the substrates. Therefore, an embodiment of the device according to the invention in which the means for joining the first and second substrates is formed independently from the cooling roller, and in which the means has one or more rollers for joining the first and second substrates, is preferred. Furthermore, in this embodiment, the means for joining the first and second substrates is preferably arranged behind the cooling roller in the process direction, the means furthermore being arranged at a distance from the cooling roller. The distance between the means and the cooling roller should not be too large in order to avoid heat loss from the thermoplastic surface and stretching in the advancement direction of the first substrate. The preferred embodiment allows a variable setting of the rotational speed of the cooling roller independently of the web speed. In a particularly preferred embodiment, the rotational speed of the cooling roller is therefore higher or lower compared to the web speed. In a particularly preferred embodiment, the cooling roller rotates at 90 to 110% of the web speed.

In a preferred embodiment of the device according to the invention, the cooling roller has means for receiving a coolant. The coolant can be selected according to the particular temperature requirements. The coolant is particularly preferably water.

The present invention also relates to a composite body which is obtained by means of the method according to the invention or using the device according to the invention. The composite body is preferably a multilayer, flexible film. In a particularly preferred embodiment, the first substrate is a flexible thermoplastic plastics film and the second substrate is selected from the group consisting of paper, metal, plastics, or multilayer substrates. In a preferred embodiment, the composite body is a composite body in which the first substrate is polypropylene or polyethylene and the second substrate is a substrate in film form based on aluminum or plastic, in particular oriented polypropylene or oriented polyethylene, the substrates being connected by an adhesive based on polyurethane. The present invention will be explained in detail with reference to the following examples, which should not be considered limiting to the inventive concept.

FIG. 1 shows an embodiment in which the cooling roller is designed as part of the means for joining the first and second substrates. The first substrate (3) is guided around a rotatably driven cooling roller (1) and is in contact therewith. For this purpose, the device can have one or more additional rollers (7) which press the first substrate against the cooling roller. The first substrate is guided past the heating elements (2) arranged around the cooling roller (1) in such a way that the thermoplastic surface of the first substrate (3) faces the heating elements (2), the thermoplastic surface of the first substrate (3) being converted into a softened state. The softened surface of the first substrate (3) is joined to a second substrate (4) in such a way that the adhesive on the surface of the second substrate (4) is located between the first substrate (3) and the second substrate (4). For this purpose, the first substrate and the second substrate are guided past a roller (6) which rotates in the opposite direction to the cooling roller (1) and which presses the second substrate (4) against the first substrate (3) which rests on the cooling roller (1). After passing the roller (6), the laminated product (5) can be fed to a winding system.

Figure 2:
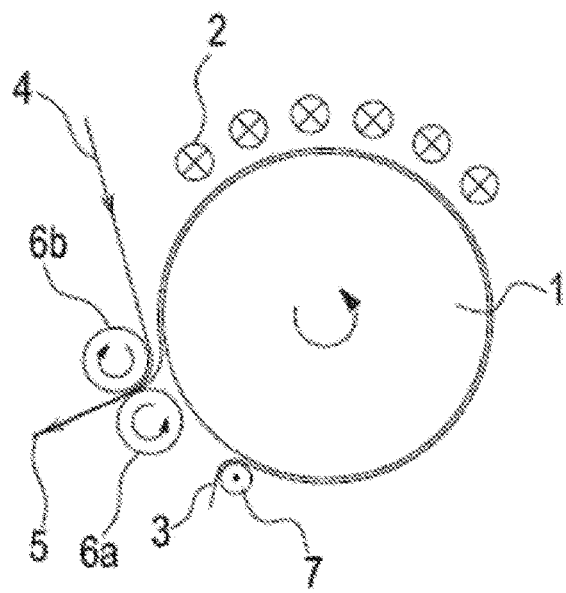
FIG. 2 shows an embodiment of the device according to the invention in which the means for joining the first substrate and the second substrate is formed independently of the cooling roller.

FIG. 2 shows an embodiment of the device according to the invention in which the means for joining the first substrate and the second substrate is formed independently of the cooling roller. The first substrate (3) is guided around a rotatably driven cooling roller (1) and is in contact therewith. For this purpose, the device can have one or more additional rollers (7) which press the first substrate against the cooling roller. The first substrate (3) is guided past the heating elements (2) arranged around the cooling roller (1) in such a way that the thermoplastic surface of the first substrate (3) faces the heating elements (2), the thermoplastic surface of the first substrate (3) being converted into a softened state. The softened surface of the first substrate (3) is joined to a second substrate (4) in such a way that the adhesive on the surface of the second substrate (4) is located between the first substrate (3) and the second substrate (4). For this purpose, the first substrate (3) and the second substrate (4) are passed through a roller group (6a, 6b) which comprises rollers running in opposite directions and which presses the second substrate (4) against the first substrate (3). After passing through the roller group (6a, 6b), the laminated product (5) can be fed to a winding system.

The invention claimed is:

1. A method for adhesively bonding a flexible film to a substrate, comprising:
   providing a flexible first substrate film having a first surface and an opposing second surface;
   providing a cooling roller having a cooling surface, the roller rotation defining a process direction;
   providing a heating element spaced from the cooling surface;
   moving the flexible film in a process direction;
   cooling the flexible film second surface by contact with the cooling roller surface while the flexible film it is moving in the process direction;
   heating the flexible film first surface to a softened state while the flexible film second surface is in contact with the cooling roller and the flexible film is moving in the process direction;
   providing a second substrate having a bonding surface;
   applying an adhesive to at least a portion of the second substrate bonding surface;

disposing the flexible film heated first surface adjacent the adhesive and the second substrate bonding surface so that the adhesive is between the flexible film heated first surface and the second substrate bonding surface; and applying pressure using a press roller rotating in a direction counter to the cooling roller rotation to force the flexible film heated first surface into contact with the adhesive and the second substrate bonding surface;

wherein the flexible film is initially only cooled and subsequently both cooled on the second surface and heated on the first surface as it moves in the process direction.

2. The method according to claim 1, wherein the heating element is an infrared (IR) heating element.

3. The method according to claim 1, wherein a weight of the adhesive on the second substrate is less than 2 g/m$^2$.

4. The method according to claim 1, wherein the adhesive applied to the second substrate is selected from thermoplastic adhesives or crosslinking adhesives in solvent-containing, aqueous or solvent-free form.

5. The method according to claim 1, wherein the flexible film is a substrate comprising polyolefin, polyvinyl chloride, ethylene copolymer, polyester, polyamide and/or polyether.

6. The method according to claim 1, wherein the second substrate is a substrate in film form which is selected from the group consisting of thermosetting plastic, thermoplastic plastic, organic polymer, metal and metal alloy.

7. The method according to claim 1, wherein a distance between the heating element and the cooling surface is variable.

8. The method according to claim 1, wherein the press roller presses the second substrate against the first substrate which rests on the cooling roller.

9. The method according to claim 1, wherein the press roller and a second roller press the first and second substrates together independently of the cooling roller.

10. The method according to claim 9, wherein the press roller and the second roller are arranged behind the cooling roller in the process direction.

11. The method according to claim 1, wherein the cooling roller has a rotational speed that is higher or lower compared with a speed of the first and second substrate.

12. The method according to claim 1, wherein the cooling roller is cooled by a liquid coolant.

13. The method according to claim 1, wherein the second substrate is a flexible film; and/or
the flexible film is a multilayer substrate having a thermoplastic first surface; and/or
the second substrate is a multilayer film.

14. A method for adhesively bonding a flexible film to a substrate, comprising:
providing a flexible first substrate film having a first surface and an opposing second surface;
providing a cooling roller having a cooling surface, the roller rotation defining a process direction;
providing a heating element spaced from the cooling surface;
moving the flexible film in a process direction;
cooling the flexible film second surface by contact with the cooling roller surface while the flexible film it is moving in the process direction;
heating the flexible film first surface to a softened state while the flexible film second surface is in contact with the cooling roller and the flexible film is moving in the process direction;
providing a second substrate having a bonding surface;
applying an adhesive to at least a portion of the second substrate bonding surface;
disposing the flexible film heated first surface adjacent the adhesive and the second substrate bonding surface so that the adhesive is between the flexible film heated first surface and the second substrate bonding surface; and applying pressure using a press roller rotating in a direction counter to the cooling roller rotation to force the flexible film heated first surface into contact with the adhesive and the second substrate bonding surface;
wherein the heating element is positioned in proximity to the point at which the flexible film is disposed to the second substrate bonding surface so that the flexible film second surface is initially cooled without the flexible film first surface being heated.

15. The method according to claim 14, wherein the flexible film is cooled by contact with the cooling roller and heated while in contact with the cooling roller without the use of belts.

* * * * *